United States Patent [19]
Lindsay

[11] Patent Number: 5,697,757
[45] Date of Patent: Dec. 16, 1997

[54] COUNTER-BALANCED LOAD CARRIERS

[75] Inventor: Richard Arthur Lindsay, Suffolk, United Kingdom

[73] Assignee: Vitec Group, plc., London, United Kingdom

[21] Appl. No.: 446,811

[22] PCT Filed: Dec. 1, 1993

[86] PCT No.: PCT/GB93/02473

§ 371 Date: Jun. 1, 1995

§ 102(e) Date: Jun. 1, 1995

[87] PCT Pub. No.: WO94/12424

PCT Pub. Date: Jun. 9, 1994

[30] Foreign Application Priority Data

Dec. 1, 1992 [GB] United Kingdom ............ 9225102

[51] Int. Cl.$^6$ ................................. B66C 23/72
[52] U.S. Cl. ................ 414/744.6; 212/197; 248/280.11; 901/48
[58] Field of Search .................. 414/719, 744.6; 212/197, 198, 199, 48; 901/48; 248/280.11

[56] References Cited

U.S. PATENT DOCUMENTS

| | | | |
|---|---|---|---|
| 3,788,585 | 1/1974 | Masseron | 248/178 |
| 4,907,768 | 3/1990 | Masseron et al. | 212/197 |
| 4,943,019 | 7/1990 | Mester . | |
| 5,186,422 | 2/1993 | Nakamura . | |

FOREIGN PATENT DOCUMENTS

| | | |
|---|---|---|
| 2488543 | 2/1982 | France . |
| 2611826 | 9/1988 | France . |
| 2828694 | 1/1980 | Germany . |
| 1440596 | 6/1976 | United Kingdom . |
| 2163720 | 3/1986 | United Kingdom . |
| 2207109 | 1/1989 | United Kingdom . |

*Primary Examiner*—Karen B. Merritt
*Assistant Examiner*—Gregory A. Morse
*Attorney, Agent, or Firm*—Kenyon & Kenyon

[57] ABSTRACT

The disclosure relates to a counter-balanced load carrier comprising a multi-stage telescopic arm (10). One stage (24) adjacent one end of the arm is mounted for rotation about a horizontal axis (29) in a carrier (17,21) mounted for rotation by a vertical axis (20) on a mobile base (11). The adjacent end stage (23) of the arm carries a counterweight and the end stage (28) at the other end of the arm carries a support (32) for a TV or video camera. The respective stages of the arm are interconnected by a cable or like mechanism to extend and retract together maintaining a fixed ratio between the radius of the payload support and the horizontal axis and the counterweight and the horizontal axis so that the arm remains counterbalanced throughout its range of extension and retraction. The cable mechanism also acts on the camera support on said end section of the arm to maintain the support horizontal throughout the range of tilting of the arm. An additional counterbalancing force can be applied at control point (39) on end stage (23) the control point being constrained to move in a vertical guideway (38) located on a horizontally moveable carriage (36) to follow the vertical/horizontal movement of the end stage of the arm.

30 Claims, 12 Drawing Sheets

COUNTER-BALANCED LOAD CARRIERS

BACKGROUND OF THE INVENTION

This invention relates to counter-balanced load carriers and is particularly, although not exclusively, applicable to load carriers for supporting television, video and cinematograph cameras.

Cameras for the above purposes are usually mounted on track or wheel mounted pedestals or on balanced arms. Pedestals are eminently suitable for use in open areas but are disadvantageous when the camera is required to move into a restricted space. Balanced arms such as the balanced arm described and illustrated in our U.K. Patent No. 2163720 enable a camera to be moved into a restricted space where a pedestal would not be able to move but involve a more cumbersome mechanism which is more difficult to transport and to store when not in use.

SUMMARY OF THE INVENTION

It is an object of the present invention to provide a counter-balanced load carrier which provides the enhanced access obtained with a balanced arm but which has a more compact form when not in use compared with that available hitherto.

This invention provides a counter-balanced load carrier comprising a multi-stage elongatable arm, a base on which the arm is mounted on one stage thereof for pivotal movement in a vertical plane about a horizontal axis, a support for a payload mounted on another stage of the arm and means to apply a counter-balancing load to the arm at a radius from said axis which varies automatically with extension and retraction of the arm in a fixed ratio with the radius of the payload support about said axis whereby the arm with a payload on the support is counter-balanced throughout its range of extension/contraction.

Preferably the arm is pivotally mounted on the base by a stage at or adjacent one end of the arm and the payload support is located at the other end of the arm.

It is further preferred that means are provided for controlling movement of the arm acting on a control point at a radius from said axis in a fixed ratio with the radius of the payload support whatever the extension/retraction of the arm whereby movements of the control point are reproduced by the payload in said fixed ratio.

More specifically the control means may include means to constrain the control point to move horizontally for horizontal movement of the payload support, to move vertically for vertical movement of the payload support or freely for any combination of horizontal/vertical movement.

In one particular arrangement according to the invention the control means may comprise a vertically extending guideway in which a guide located at said control point engages and a horizontally extending guideway which constrains movement of said guideway, means being provided for locking the guide at the control point in the vertical guideway and for locking the vertical guideway against movement along the horizontal guideway to control movement of the control point as required. In addition the vertically extending guideway may be supported on a carriage which is constrained to move along said horizontally extending guideway.

In a further arrangement according to the invention drive means may be provided for moving said control point horizontally, vertically or in any combination thereof.

By way of example the control point may be located on a stage of the arm adjacent to the stage on which the arm is mounted for rotation about said horizontal axis.

In any of the above arrangements the means to apply a counter-balancing load to the arm may comprise a weight and/or a force applying device acting vertically on the arm on the same or separate stages.

In one arrangement the arm may be pivotally mounted about said horizontal axis at a stage adjacent an end of the arm and a weight acts on the stage at said one end.

Further a force applying device may act on said end stage of the arm or on another stage of the arm on the other side of the horizontal axis.

Preferably the force applying device and/or weight are adjustable to cater to different payloads on the payload support.

In the case where the arm has a control point constrained to move in a vertically extending guideway, the force applying device may be mounted on the guideway to act on the arm through said control point.

It is further preferred that the elongatable arm is a telescopic arm.

In any of the above arrangements means may be provided for interconnecting the respective stages of the arm whereby each stage moves by the same amount with respect to the adjacent stage or stages as the arm is extending/retracted.

For example a pulley system interlinks the stages to cause the stages to move by the same amounts with respect to each other as the arm is extended/retracted.

In one specific arrangement according to the invention one pulley system is provided for causing the stages to move by the same amounts as the arm is extended and another pulley system is provided for causing the stages to move by the same amounts as the arm is contracted.

In any of the above arrangements means may be provided to maintain the payload support in a fixed attitude with respect to the ground whatever the position the arm is tilted to about said horizontal axis.

For example the payload support may be mounted on the arm to tilt about a horizontal axis with respect to the arm and drive means may be provided extending through the arm operated by tilting the arm about said horizontal axis of the arm mounting to tilt the payload support with respect to the arm to maintain the support in a constant attitude to the ground.

In the case where a pulley system is provided for controlling the extension/retraction of the arm, the drive means for the payload support may be incorporated in the pulley system.

In any of the above arrangements the pivot for the arm may be mounted on a support which is mounted on said base for rotation about a vertical axis for swinging the arm about said axis.

Also in any of the above arrangements the base may be supported on wheels which may be steerable for movement over the floor/ground.

BRIEF DESCRIPTION OF THE DRAWINGS

The following is a description of some specific embodiments of the invention, reference being made to the accompanying drawings in which.

DETAILED DESCRIPTION OF THE PREFERRED EMBODIMENTS

Figure 1:
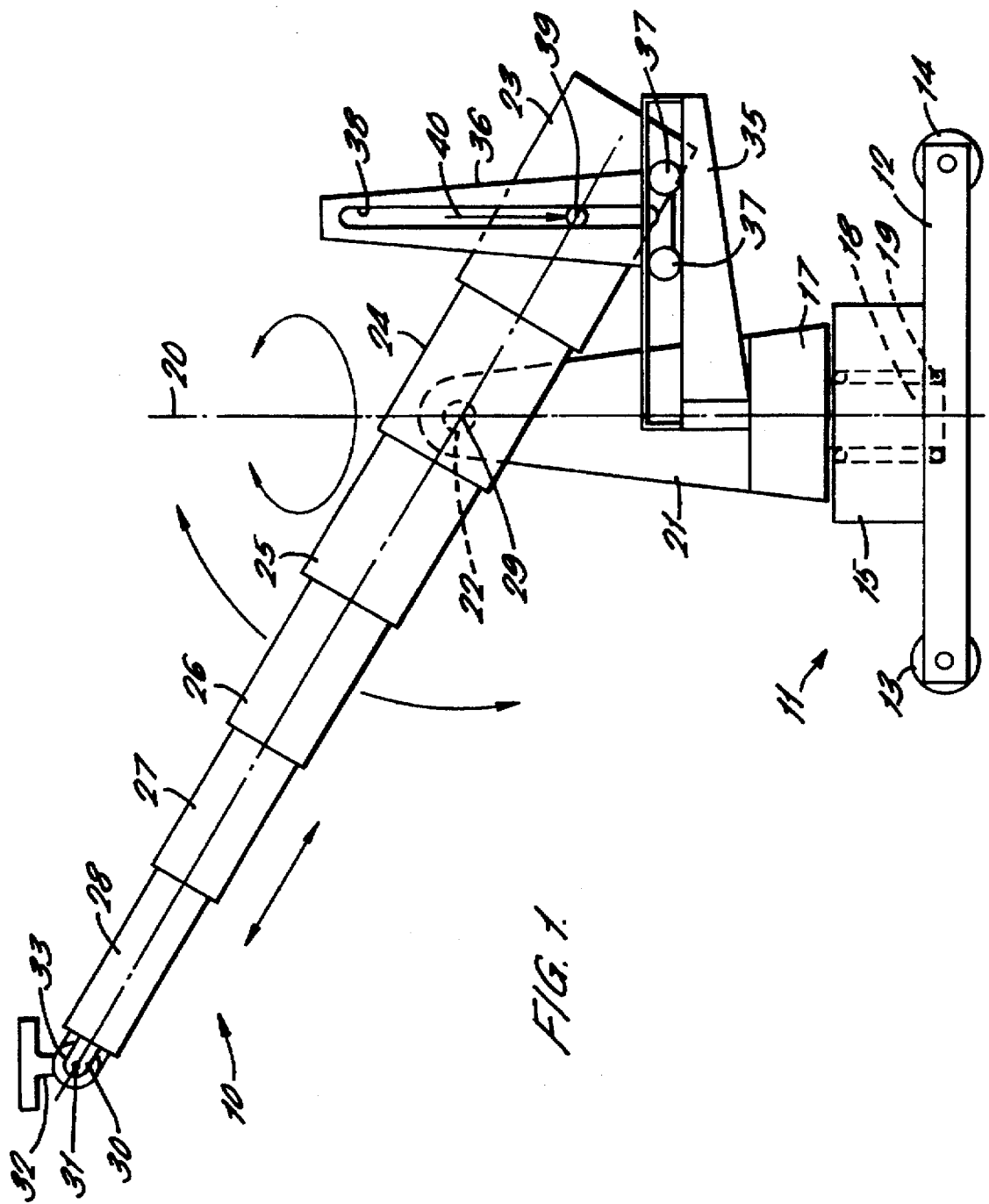
FIG. 1 is a diagrammatic view showing a camera carrier including a telescopic counter-balanced arm on which the camera is mounted shown in the fully extended position.

Referring firstly to FIG. 1 of the drawings, there is shown a carrier for a television or video camera comprising a counter-balanced telescopic arm indicated generally at 10, mounted on a mobile base indicated generally at 11. The base comprises a platform 12 supported on fore and aft ground wheels 13, 14 to enable the base to be moved over the floor or ground on which it rests, the wheels being steerable through mechanisms not shown.

A hub 15 is mounted on the base on which a carrier 17 for the telescopic arm is mounted by means of a shaft 18 projecting downwardly from the carrier and engaging in bearings 19 supported in the hub for rotation of the carrier 17 about the vertical axis 20 or azimuth. A lock (not shown) is provided for locking the pedestal against rotation when required. Carrier 17 is formed with an upwardly extending bifuricated pedestal the spaced arms 21 of which have inwardly extending trunnions 22 at their upper ends to receive and support the arm for tilting about a horizontal axis as described below.

Figure 2:
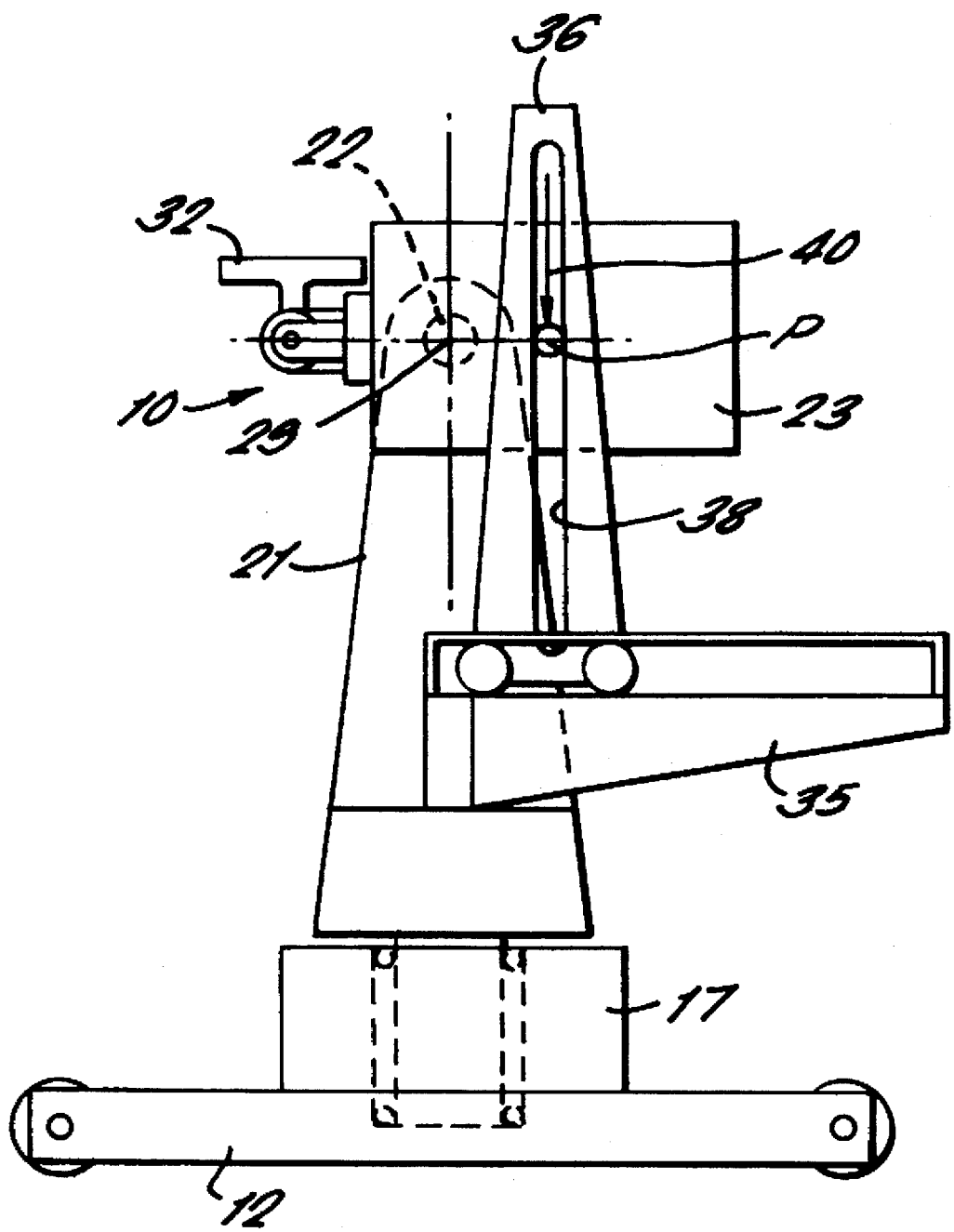
FIG. 2 is a similar view to FIG. 1 showing the telescopic arm fully contracted.

The telescopic arm comprises six elements or stages 23 to 28 which are slidably engaged one within the other to move between the extended position shown in FIG. 1 and the retracted position shown in FIG. 2. A mechanism which interlinks the successive elements of the arm so that when the arm is extended, all the elements extend by the same amounts with respect to each other and when contracted contract by the same amounts with respect to each other will be described later.

The arm is pivotally mounted on the trunnions 22 at the intermediate element 24 next to end element 23, for rotation of the arm about a horizontal axis 29 defined by the trunnions.

The outer end stage 28 of the arm terminates in a spaced pair of lugs 30 in which a spindle 31 is mounted. A camera support platform 32 is mounted for rotation on the spindle with a drive wheel 33 for controlling the movement of the platform. The platform is provided with a conventional dovetail section slideway or the like to receive a mounting plate of a camera. The platform is maintained horizontal whatever the inclination of the arm through a mechanism to be described later.

The end element 23 of the arm contains a fixed weight (not shown) intended to balance the arm whether telescoped or extended together with the camera platform and a nominal camera load on the platform.

The carrier 17 has a horizontally extending guideway 35 projecting from between the bracket and a carriage 36 has wheels 37 constrained to run in the guideway to support the carriage for horizontal movement along the guideway. The carriage is formed with a vertically extending slot 38 in which a pin 39 on the end stage 23 is constrained to slide so that as the arm tilts about the horizontal axis 29, so the pin will slide up and down the slot 38 and, at the same time the trolley will move along the guideway. A force applying device is mounted on the trolley 36 acting on the pin 39 in a vertically downward direction as indicated by the arrow 40 to apply an additional load to the arm as required to balance the arm. The force applying device is variable so that the load applied to the arm can be adjusted as required to suit the particular camera weight.

The force applying device may be a pneumatic ram with a large pressure chamber in which case the pressure supplied to the ram is adjusted to match the force required. The pneumatic ram could be a tapered pneumatic ram to provide a constant force for any extension of the ram. In an alternative arrangement, the trolley and force applying device could be dispensed with and a series of weights provided to be added to or taken from the end stage to achieve counterbalancing of the arm.

Locking means may be provided for locking the carriage on the guideway and the pin in the slot of the carriage to lock the arm in a fixed position of adjustment if required. Likewise, a locking device may be provided for locking the carrier 17 in a selected rotational position in the hub 15.

The following table shows the effect of locking and unlocking, either alone or in combination, any of the aforementioned locking means.

| Vertical | Horizontal | Azimuth | Effect on load carrying platform |
|---|---|---|---|
| locked | locked | locked | locked in selected position |
| locked | locked | unlocked | peripheral circular motion on horizontal plane |
| locked | unlocked | locked | motion in horizontal line. |
| unlocked | locked | locked | motion in vertical line. |
| locked | unlocked | unlocked | motion on horizontal plane. |
| unlocked | unlocked | locked | motion on vertical plane. |
| unlocked | locked | unlocked | motion on a cylindrical plane. |
| unlocked | unlocked | unlocked | complete freedom of motion. |

Figure 4:
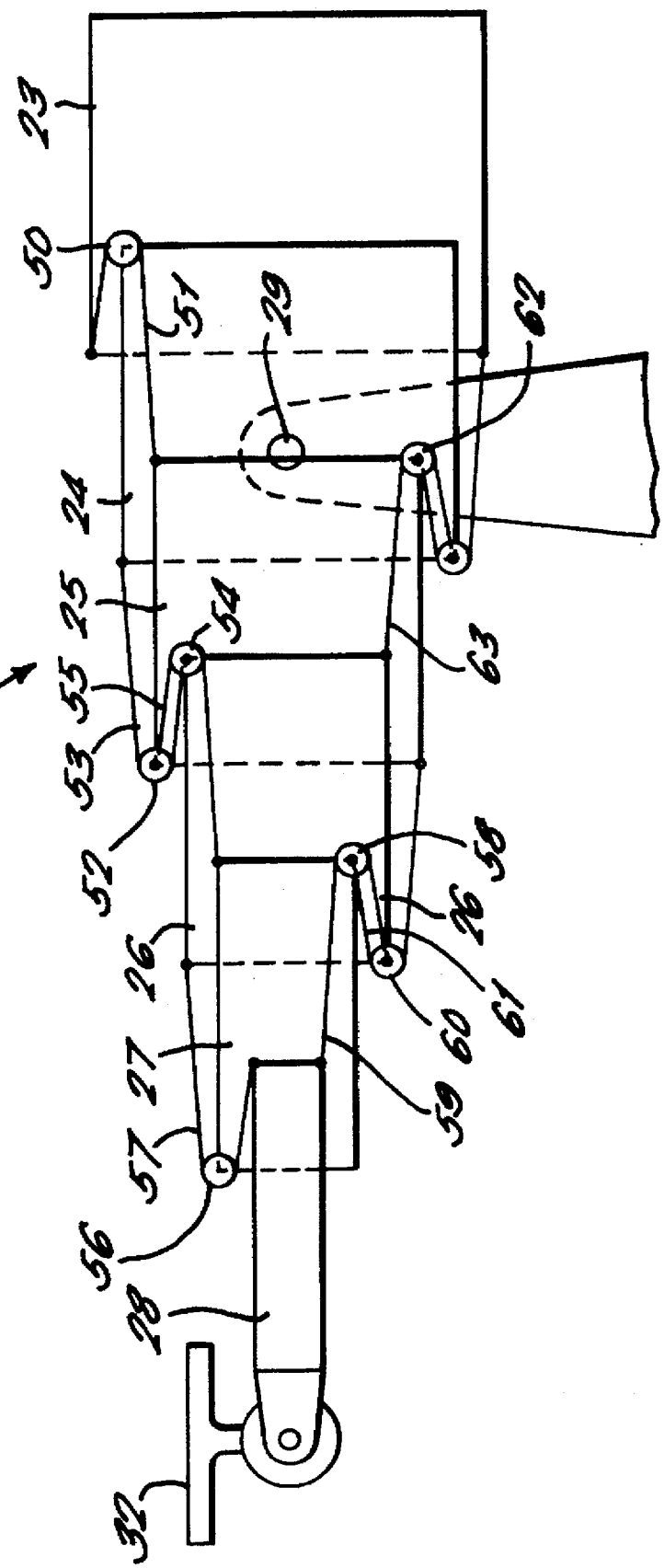
FIG. 4 is a diagrammatic view of the mechanism extending through the arm for controlling the relative extension of the several stages of the arm.

As indicated above, the stages of the arm extend and contract by uniform amounts and the mechanism interconnecting the stages to achieve this will now be described with reference to FIG. 4 of the accompanying drawings. Looking at the upper side of the arm, the lower or inner end of intermediate stage 24 carries a rotatable pulley 50 and a wire 51 extends over the pulley 50 and is anchored to the upper or outer end of the stage 23 and the bottom or inner end of stage 25. The upper or outer end of stage 25 is provided with a pulley 52 around which a wire or other form of tether 53 extends from the outer end of stage 24 to the bottom end of stage 26. The bottom end of stage 26 is also provided with a freely rotatable pulley 54 and a wire 55 is connected to the upper end of stage 25 and extends around the pulley 54 to the bottom of stage 27. Finally, the outer end of stage 27 has a freely rotatable pulley 56 and a wire 57 extends from the upper end of stage 26 around the pulley to the bottom end of stage 28. The arrangement continues along the underside of the arm with a pulley 58 at the bottom of stage 27 with a wire 59 extending from the bottom of stage 28 around the pulley to the top of stage 26; a pulley 60 at the top of stage 26 with a wire 61 extending from the bottom of stage 27 to the top of stage 25 and a pulley 62 at the bottom of stage 25 and a wire 63 extending from the bottom of stage 26 around the pulley to the top of stage 23.

The interconnections between the stages provided by the wire/pulley arrangements ensures that as the arm is extended, all stages of the arm move outwardly with respect to each other by the same amounts and, as the stages of the arm are telescoped together, they move together by the same amounts. As a result, the ratio between the radius of the camera platform and axis 29 and the radius of the weight or other load acting on the stage 23 about axis 29 maintains a fixed ratio so that the arm is counter-balanced throughout its range of extension and retraction.

Figure 3:
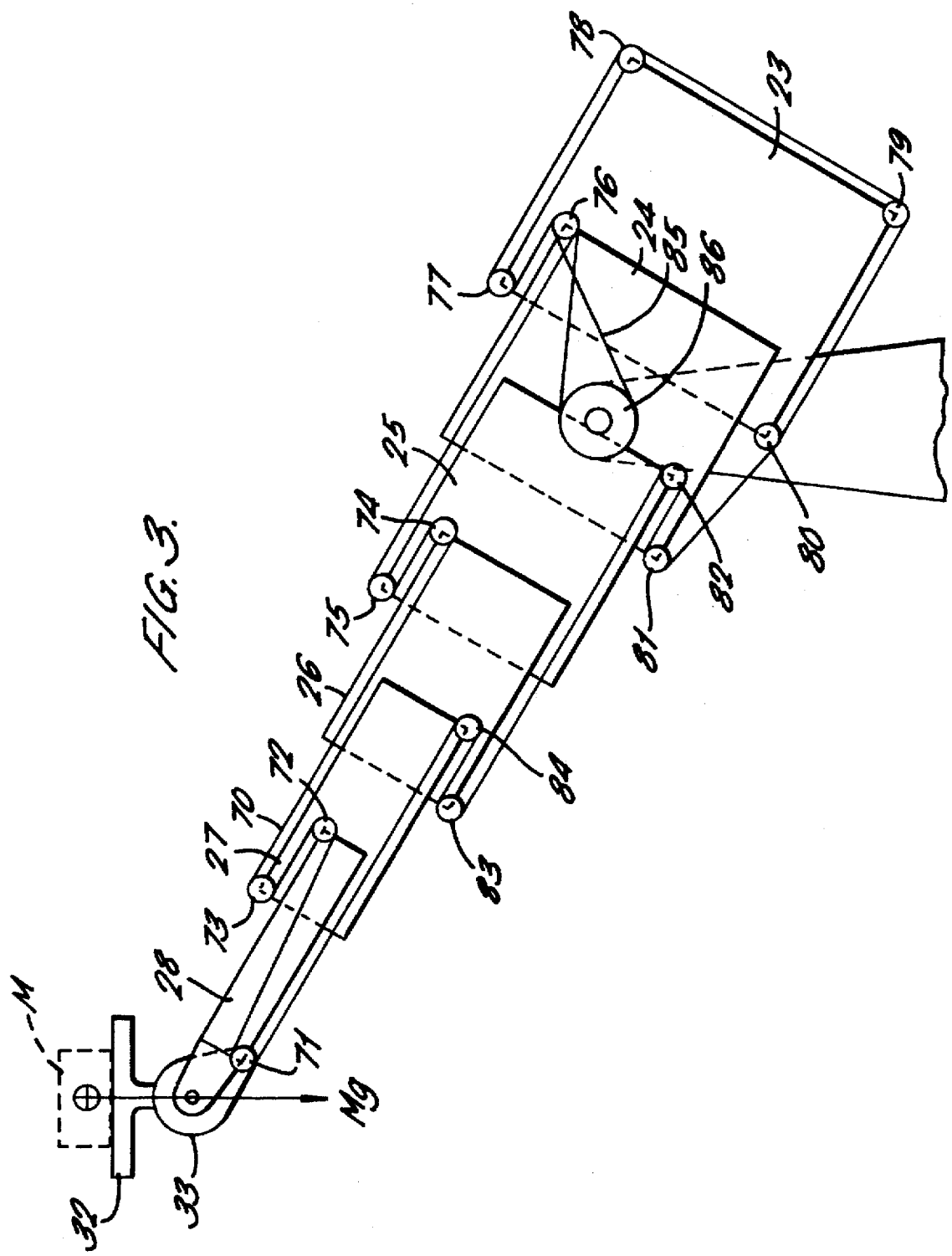
FIG. 3 is a diagrammatic view of the arm showing a mechanism for controlling the attitude of a camera support at the arm of the arm with tilting of the arm to maintain the support horizontal.

Reference is now made to FIG. 3 of the drawings which illustrates the mechanism for maintaining the camera platform 32 horizontal throughout the range of pivotal movement of the telescopic arm abouts its horizontal axis. The system comprises an endless cable or belt transmission 70 extending from a pulley 71 at the outer end of stage 28 of the arm, around a pulley 72 at the bottom of stage 28, around a pulley 73 at the upper end of stage 27, around a pulley 74 at the bottom of stage 26, around a pulley 75 at the top of stage 25, around a pulley 76 at the bottom of stage 24, around a pulley 77 at the top of stage 23, around pulleys 78 and 79 at the bottom of stage 23, around a pulley 80 at the top of stage 23, around a pulley 81 at the top of stage 24, around a pulley 82 at the bottom of stage 25, around a pulley 83 at the top of stage 26, around a pulley 84 at the bottom of stage 27 and thence around the pulley 71. The pulley 76 is coupled side-by-side with a similar pulley which is driven by a twistless endless belt drive 85 encircling a fixed wheel 86 mounted on the spindle supporting the arm for rotation. Thus, as the arm rotates about the spindle, the fixed pulley 86 causes the pulley 76 to rotate driving the endless belt 70 in one or other direction with respect to the arm. As indicated above, the belt 70 drives pulley 71 at the outer end of the outer stage 28 of the arm. A further pulley is mounted side-by-side with pulley 71 having an endless belt drive 72 to the wheel 33 to which the camera platform is fixed. Thus, when the belt drives the pulley 71 as a result of pivoting of the arm about the axis 29, the camera platform is also rotated with respect to the arm and the various ratios of the drives are set so that the platform is maintained in its horizontal attitude as illustrated in FIG. 3 throughout the tilting of the arm.

Other possible arrangements for maintaining the platform horizontal include:

(i) telescopic torque shaft;
(ii) gimballed camera mounting;
(iii) servo motor control of load orientation with rotational sensor at axis 29;
(iv) force applied through flexible cable;
(v) a hydraulic drive;
(vi) a servo motor drive.

Figure 5:
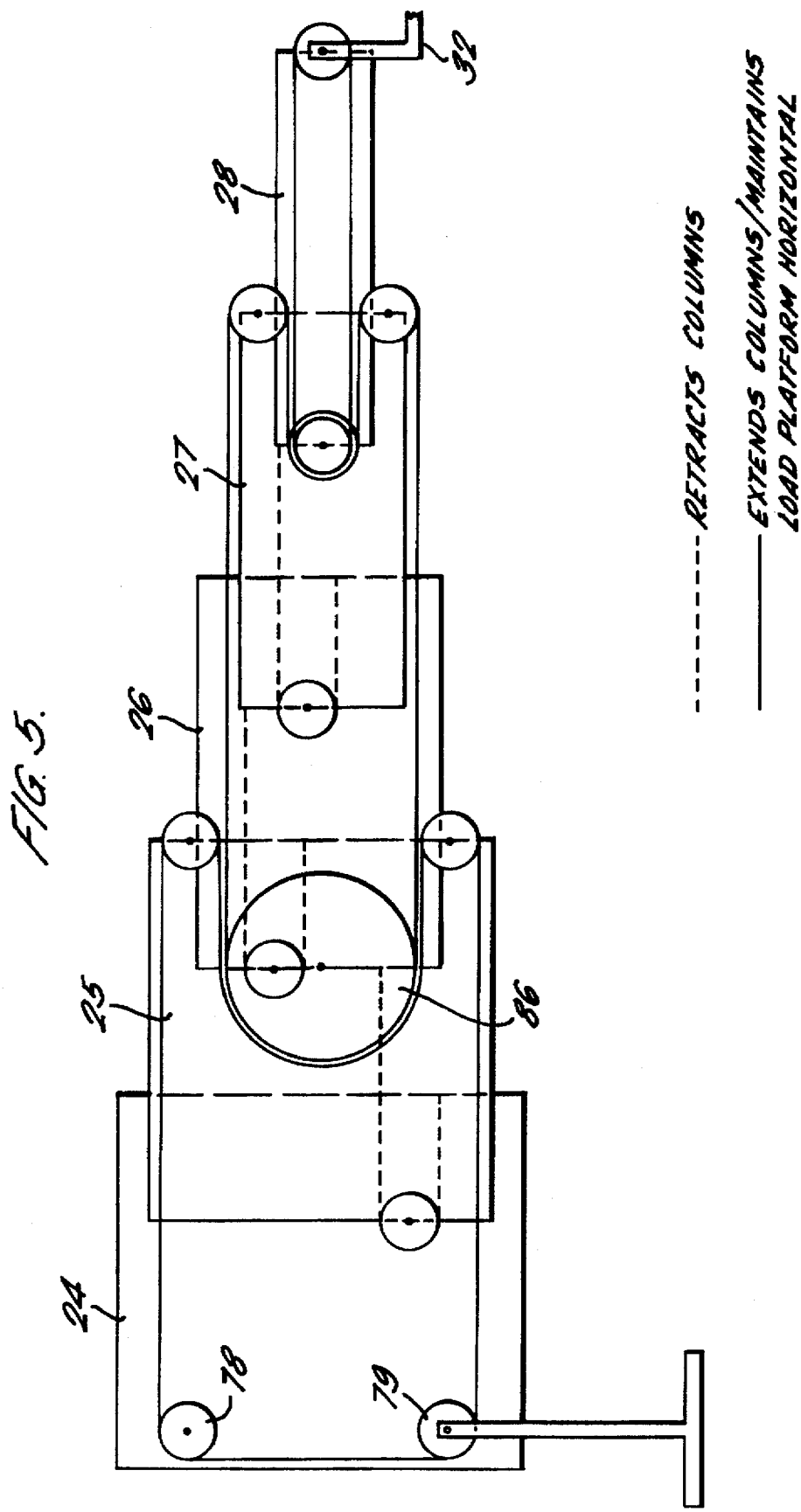
FIG. 5 is a similar view to FIG. 4 showing a mechanism which controls both extension and attitude of the camera support.

A further arrangement is illustrated in FIG. 5 in which the system for controlling the extension of the arm is combined with the endless belt system for maintaining the camera support horizontal.

Other possible arrangements for extending/retracting the telescopic arm include:

i) hydraulic drive
ii) servo motors

Manual positional control of the load carrying platform is preferably performed directly at the load carrying platform but remote positional control of the load carrying platform is preferably performed at the control pivot points of the arm and may, as the balanced arm is fully balanced, be controlled by three small electric motors, or the like; one for vertical, one for horizontal and one in azimuth; remotely controlled via signal lines. Control by this method has the added advantage that the movement of the load is proportional to the control point displacement provided by the motors.

Figure 6:
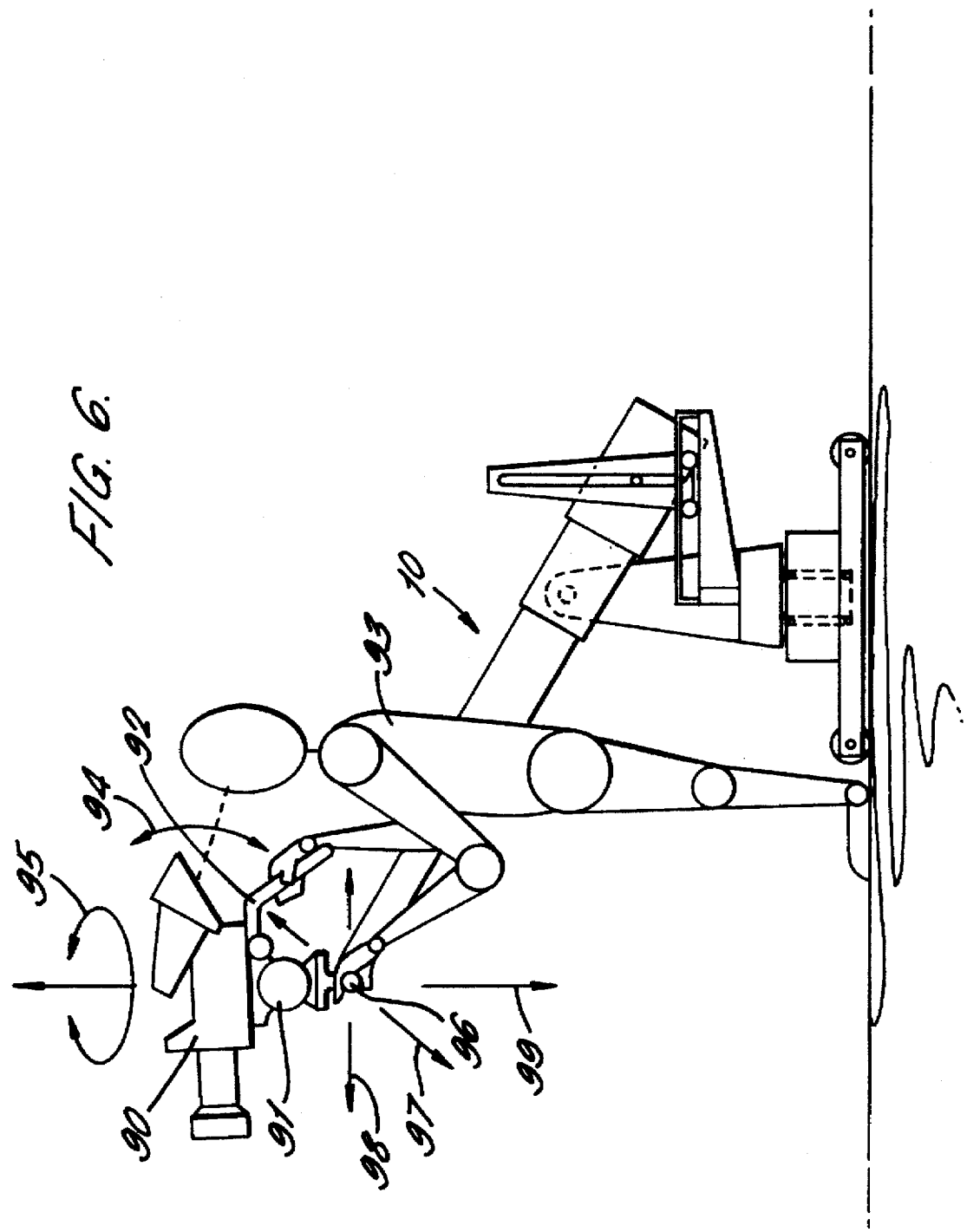
FIG. 6 is a diagrammatic view of the camera carrier with a video camera installed and in use by an operator by direct movement of the camera.

FIG. 6 of the drawings illustrates the carrier in use supporting a T.V. camera 90 mounted on the platform 32 by means of a pan/tilt head indicated at 91. The camera has a hand control bar 92 for an operator illustrated diagrammatically at 93, for moving the camera in tilt and pan as indicated by the arrows 94 and 95. The upper end of the arm 10 has a cross bar 96 for the operator to move the camera laterally as indicated by the arrows 97 fore and aft as indicated by the arrows 98 and up and down as indicated by the arrows 99 as provided by the telescopic arm and its mounting with the movement of the camera being counter-balanced throughout.

Figure 7:
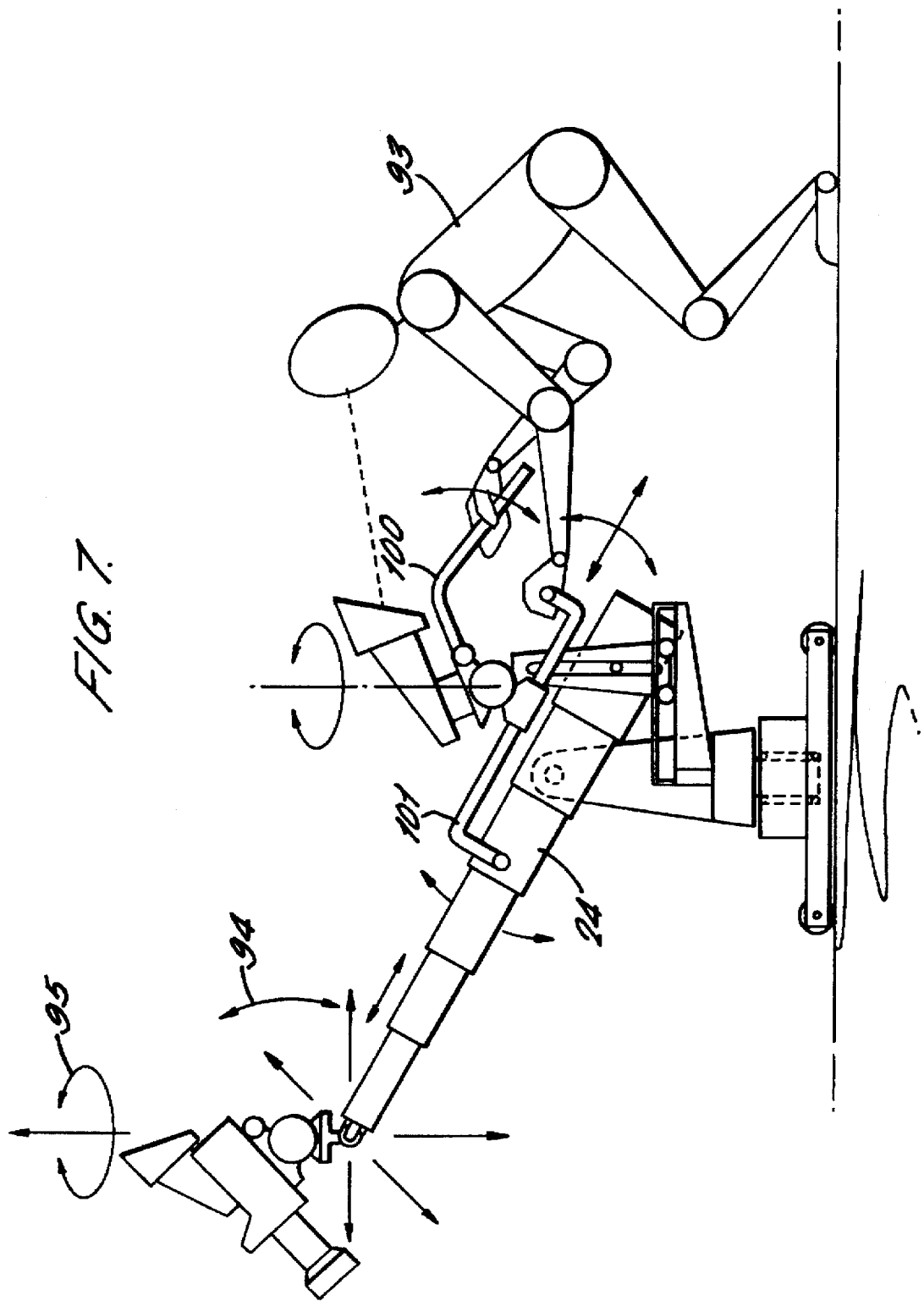
FIG. 7 illustrates a form of the carrier adapted for "crane" control operator from the mounted end of the arm.

FIG. 7 of the drawings shows a variation on the arrangement in FIG. 5 in which the camera mounting is provided with servo motors for the pan and tilt movements 94, 95 with a controller 100 at the lower end of the arm for the operator to effect pan and tilt movement of the camera. Lateral, fore and aft and up and down movement of the camera is effected through a control arm 101 and connected to an intermediate stage 24 of the arm for effecting tilt rotation and extension/retraction of the arm.

Figure 8:
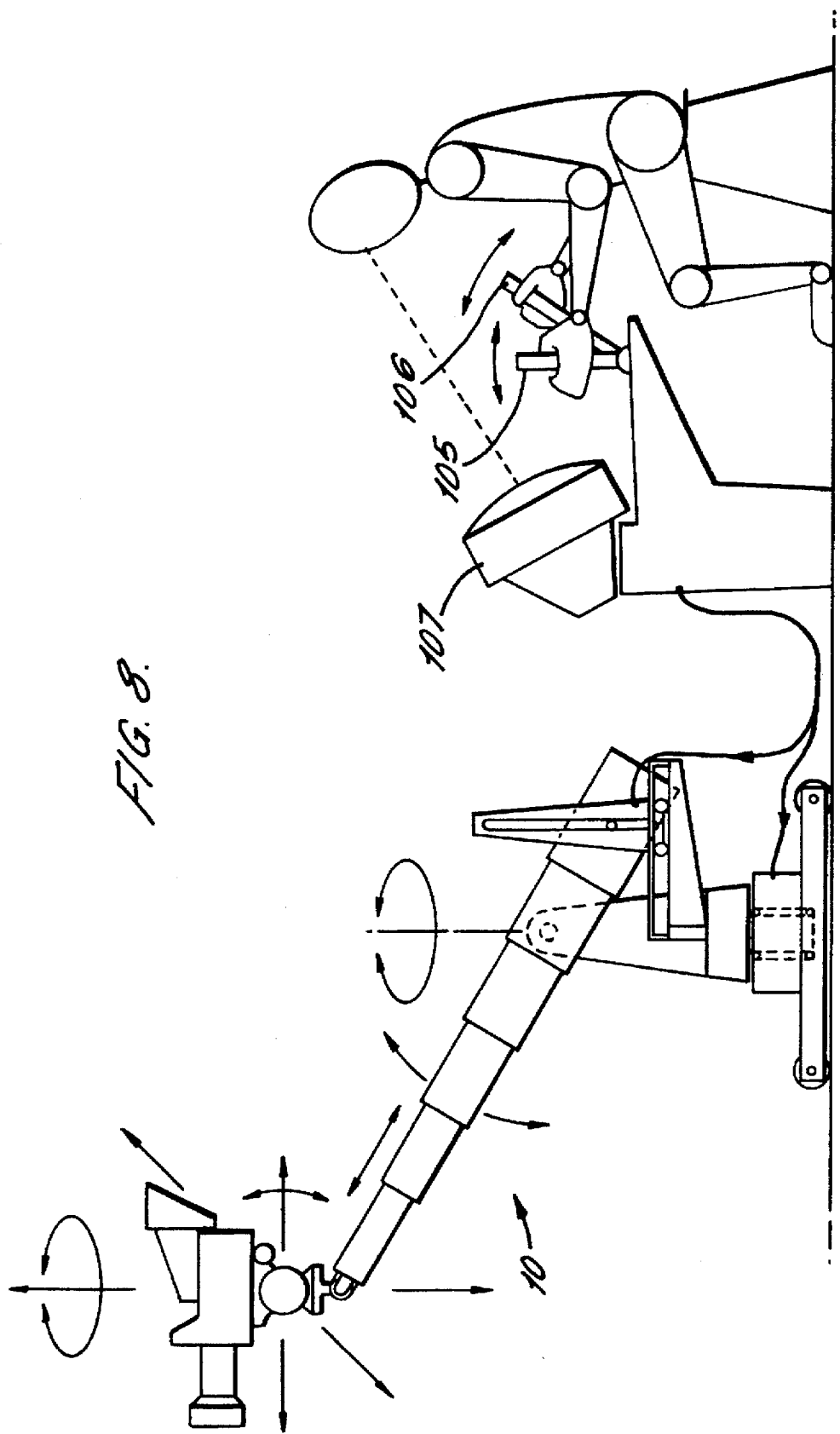
FIG. 8 is a further modified version of the carrier adapted for remote control of the camera.

FIG. 8 of the drawings shows a further modification in which servo motors are also provided for extending/retracting the arm rotating the carrier 17 about the platform and tilting the arm about the carrier operable from a remote control camera position by means of joy sticks indicated at 105 and 106 with a remote monitor 107 for the camera operator to review the picture seen by the camera.

Figure 9:
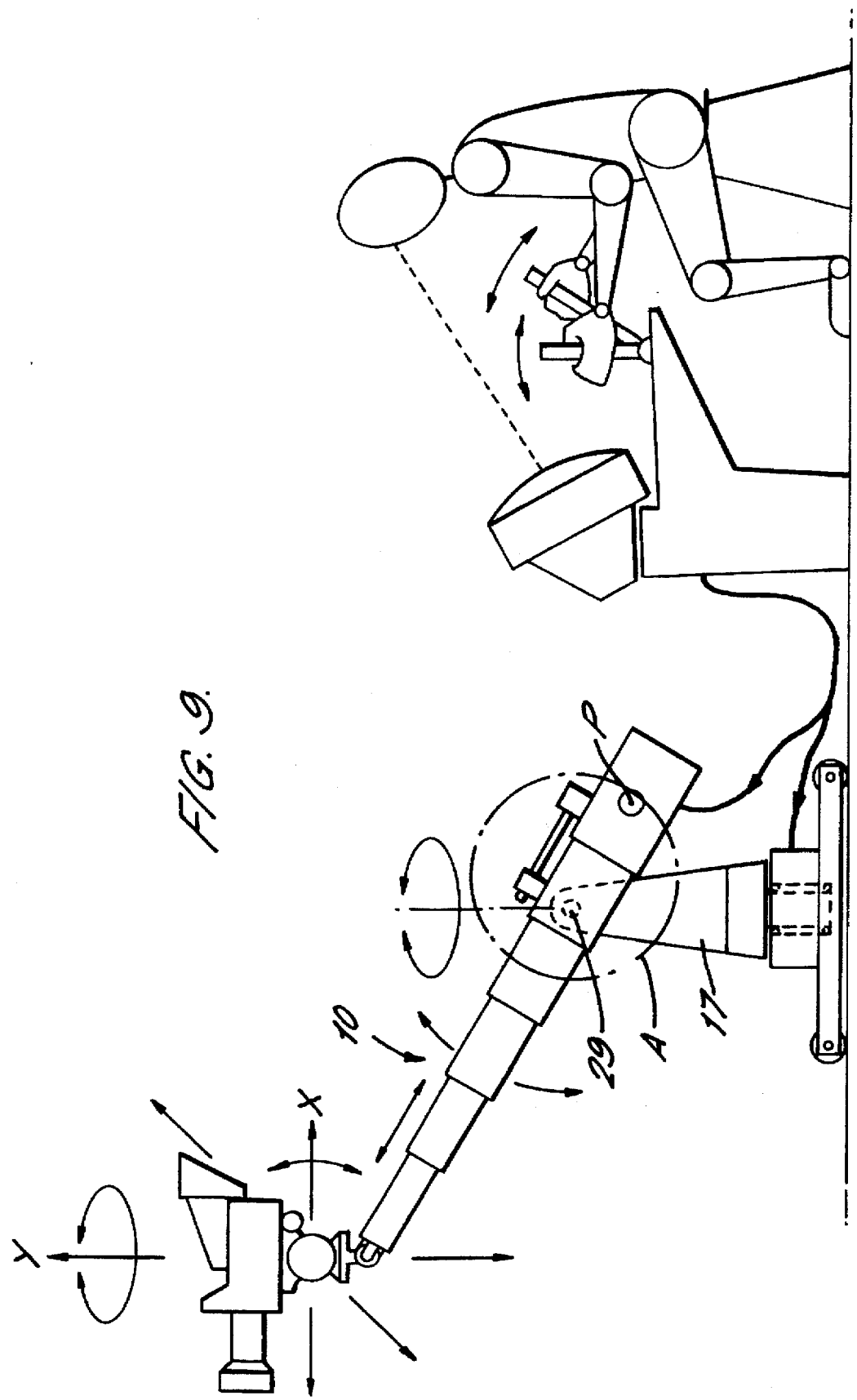
FIG. 9 is a similar view to FIG. 8 showing a further arrangement according to the invention.
Figure 10:
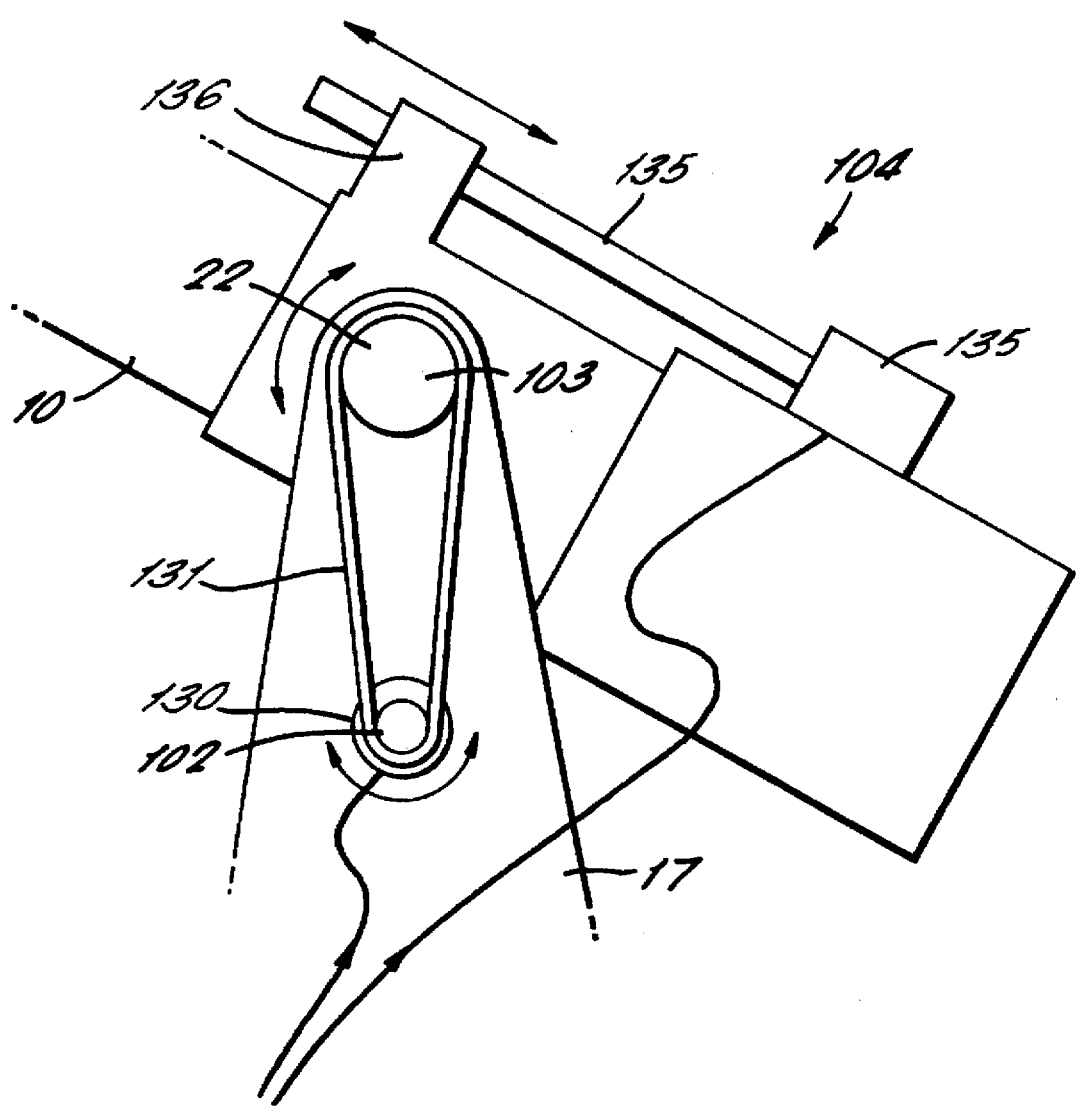
FIG. 10 is a detailed view of the area A encircled on FIG. 9.
Figure 11:
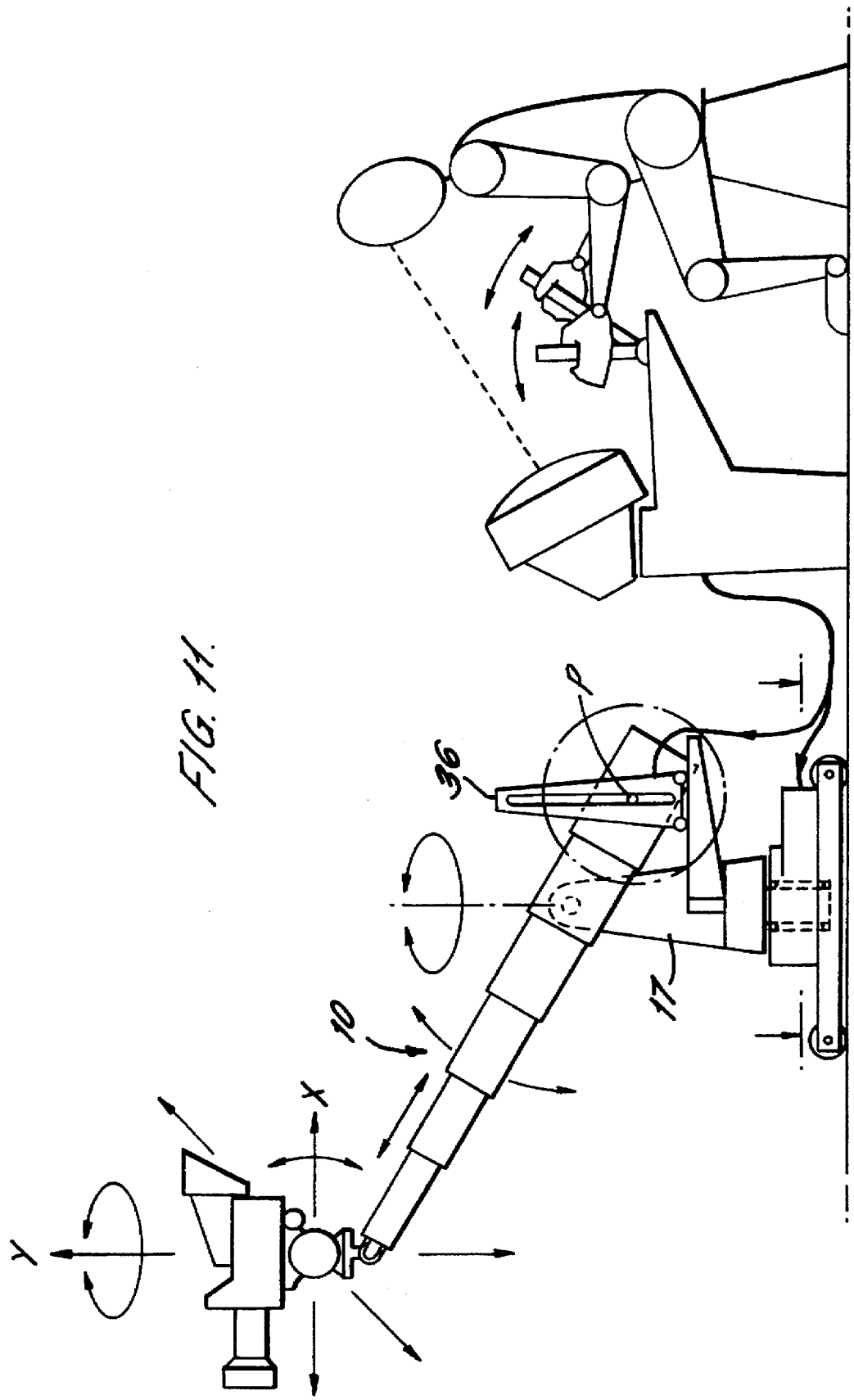
FIG. 11 is a further similar view to FIG. 8 with the system for tilting the arm highlighted.

Referring to FIGS. 9 and 10 of the drawings, a drive for tilting the extendable arm 10 about its horizontal axis 29 is illustrated comprising a motor 130 mounted within the column 17 of the pedestal below the arm and having a chain/belt drive 131 extending around sprockets/pullies 102, 103 secured to the motor and to the shaft 22 on which the arm is mounted. The motor is controlled from the remote control camera position illustrated in rotation of the arm as directed by the operator.

A further feature of the construction is the use of a linear actuator for positively extending and retracting the arm. The linear actuator drive unit 104 is mounted on the lowermost section of the arm and the drive element 135 of the actuator extends parallel to the arm to engage in a fixture 136 on the adjacent element of the arm. The arm contains the cable/belt mechanism described above with reference to FIGS. 1 to 5 of the drawings for transmitting movement between the respective sections of the arm so that the sections move in unison by the same amount with respect to each other as the arm is extended and retracted. Thus movement of the lowermost section of the arm with respect to the adjacent section by the linear actuator by a precise predetermined amount under the control of the camera operator will move all of the sections of the arm with respect to each other by the same amount to provide a movement at the camera support end of the arm which is the sum of the movements of the respective sections with respect to each other.

Figure 12:
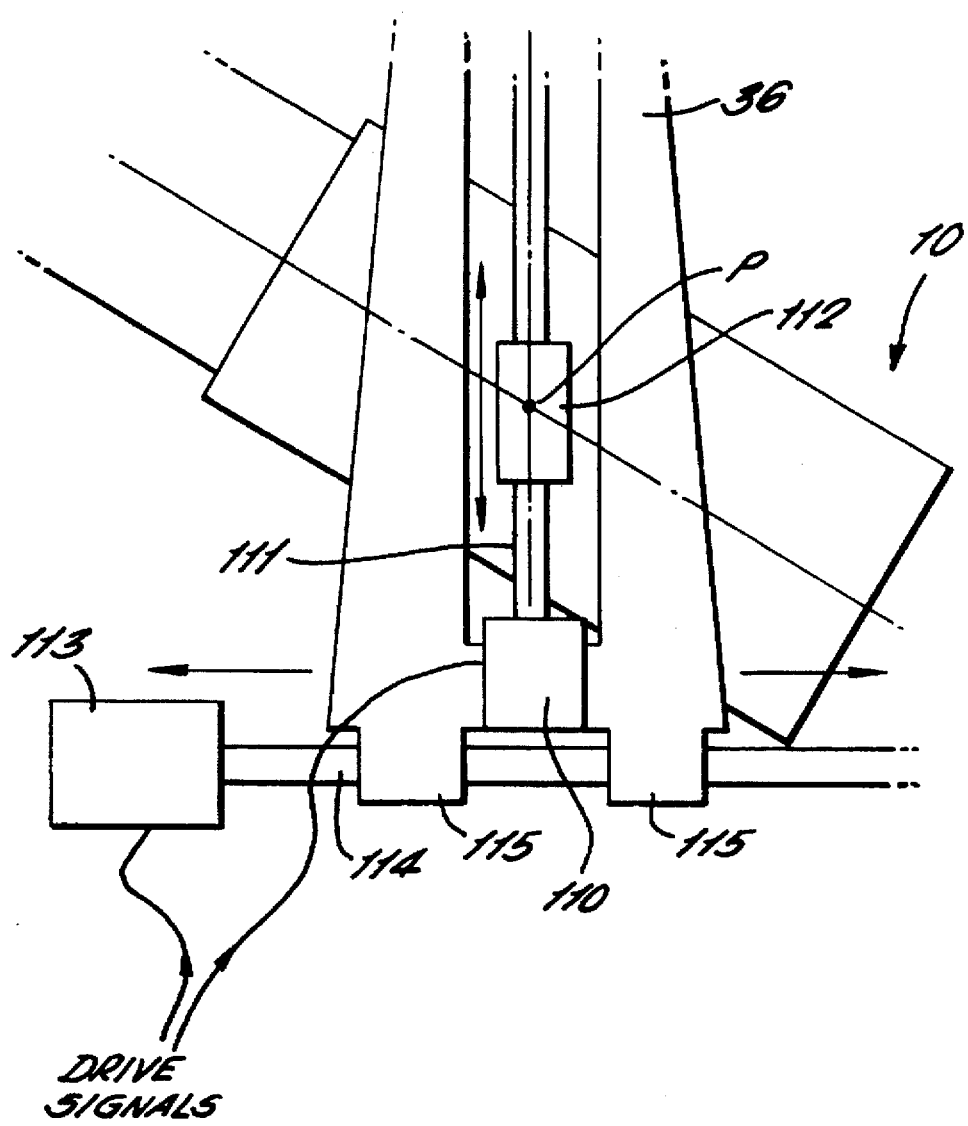
FIG. 12 is a detailed view of the tilting system shown in FIG. 11.

Referring now to FIG. 12 of the drawings, a motorised arrangement for the vertical/horizontal movements provided by the carriage 36 is shown. A vertically extending linear actuator is mounted on the carriage having a motor unit 110 with an elongate drive element 111 engaging in a fixture 112 secured to the arm at control point P. A horizontally extending linear actuator is mounted on the column comprising a motor unit 113 and an elongate drive element 114 engaging in fixtures 115 on the carriage horizontally. Thus the position of the control point can be adjusted to control the X/Y position of the camera platform from the remote control position.

Figure 13:
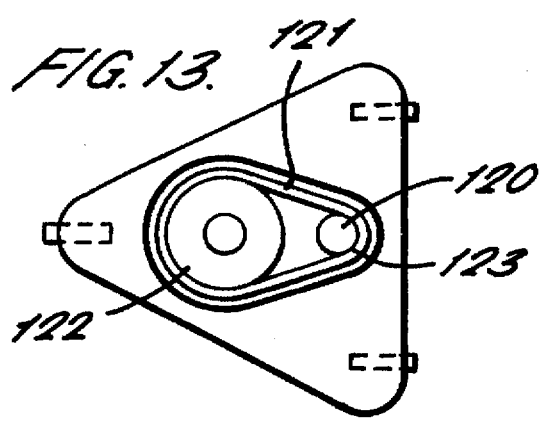
FIG. 13 is a plan view of the pedestal base showing a motor drive for rotation of the arm about a vertical axis.

In addition, a further drive motor is provided for rotating the column of the pedestal about its vertical axis on the base controlled from the remote control station for the camera. Referring to FIG. 13 a motor unit 120 is mounted on the base of the pedestal with a chain/belt drive 121 extending around sprockets/pulleys 122, 123 on the motor shaft and column end for rotating the column. Thus the whole of the movements of the camera and pedestal can be governed from the remote control station by the camera operator.

It will be appreciated that the invention is not confined to the above described embodiments and many modifications may be made thereto without departing from the scope of the invention. For example the arrangements for providing horizontal/vertical movement of the end stage of the arm comprising the horizontal guideway 35 and carriage 36 with its vertical guideway may be replaced by other guidance arrangements such as templates defining prescribed movements and cams on the arm to follow the templates.

I claim:

1. A counter-balanced load-carrier comprising:
   a multi-stage elongatable arm,
   a base to which a first stage of the arm is pivotally coupled for movement in a vertical plane about a horizontal axis,
   a support for a payload mounted on a second stage of the arm, wherein a distance of the payload support from the axis defines a first radius,
   means to apply a counter-balancing load to the arm at a second radius from said axis, wherein said second radius varies automatically upon extension and retraction of the arm in a ratio fixed with respect to the first radius, whereby the arm with a payload on the support is counter-balanced throughout its range of extension/retraction,
   a control point provided on a stage of the arm other than said first stage at a third radius from said axis, wherein the third radius varies in a ratio fixed with respect to the first radius upon extension and retraction of the arm whereby movement of the control point is reproduced by the movement of the payload in said fixed ratio, and
   means to constrain the horizontal and vertical movement of the control point, wherein, in a first state, the means to constrain restricts the movement of the control point to a horizontal plane and, in a second state, the means to constrain restricts the movement of the control point to a vertical plane and, in a third state, the control point may move vertically and horizontally, so that the payload moves in a corresponding manner.

2. A counter-balanced load carrier as claimed in claim 1, wherein the payload support on the arm is adapted to receive a T.V., video or cinematographic camera mounted on the support for pan and tilt movement.

3. A load carrier as claimed in claim 2, wherein servo-motors are provided for moving the camera with respect to the support in pan and tilt directions with respect to the support and control means are provided for effecting said pan and tilt movement of the camera.

4. A load carrier as claimed in claim 3, wherein the control means for the servo motors are located adjacent the end of the arm remote from the payload support.

5. A load carrier as claimed in claim 4, wherein the control means comprise a universally mounted control arm rotation of which about a vertical axis causes pan movement of the camera and rotation about the horizontal axis causes tilt movement of the camera through said servo-motors.

6. A load carrier as claimed in claim 5, wherein a viewfinder is mounted on the control arm and is remotely coupled to the camera to replicate the field of view of the camera at the control member.

7. A load carrier as claimed in claim 1, wherein the means to apply a counter-balancing load to the arm comprise a weight and/or a force applying device acting vertically on the arm on the same or separate stages.

8. A load carrier as claimed in claim 7, wherein the arm is pivotally mounted about said horizontal axis at a stage adjacent an end of the arm and a weight and/or force applying device acts on the stage at said one end.

9. A load carrier as claimed in claim 8, wherein a force applying device acts on said end stage of the arm or on another stage of the arm on the other side of the horizontal axis.

10. A load carrier as claimed in claim 7, wherein the weight or force applying device are adjustable to cater for different payloads on the payload support.

11. A load carrier as claimed in claim 1, wherein means to constrain comprises a vertically extending guideway in which a guide located at said control point is received and a horizontally extending guideway constraining movement of said vertical guideway, means being provided for selectively locking the guide in the vertical guideway and for selectively locking the vertical guideway in the horizontal guideway to control the movement of the control point.

12. A load carrier as claimed in claim 11, wherein the vertically extending guideway is supported on a carriage which is constrained to move along said horizontally extending guideway.

13. A load carrier as claimed in claim 11, wherein the force applying device is mounted on the guideway to act on the arm through said control point.

14. A load carrier as claimed in claim 1, wherein the arm is pivotally mounted on the base by a stage at or adjacent one end of the arm and the payload support is located at the other end of the arm.

15. A load carrier as claimed in claim 1, wherein the control point on the arm is guided by a template defining a prescribed path and a cam follower is provided on the arm at the control point to engage and be guided by the template to control movement of the support on the arm.

16. A load carrier as claimed in claim 1, wherein drive means are provided for moving said control point horizontally, vertically or in any combination thereof.

17. A load carrier as claimed in claim 1, wherein the control point is located on a stage of the arm adjacent to the stage on which the arm is mounted for rotation about said horizontal axis.

18. A load carrier as claimed in claim 1, wherein the elongatable arm is a telescopic arm.

19. A load carrier as claimed in claim 1, wherein the pivot for the arm is mounted on a support which is mounted on said base for rotation about a vertical axis for swinging the arm about said axis.

20. A load carrier as claimed in claim 1, wherein the base is supported on wheels for movement of the base over the floor/ground.

21. A counter-balanced load carrier comprising:
a multi-stage elongatable arm,
a base to which a first stage of the arm is pivotally mounted for movement in a vertical plane about a first horizontal axis,
interconnecting means coupled between the stages of the arm for controlling the motion of the stages relative to one another so that when the arm is extended, the stages separate by equal amounts and, when the arm is retracted, the stages close up by equal amounts,
a support for a payload mounted on a first end of the arm, wherein a distance between the payload support and the first axis defines a first radius, wherein the payload support is coupled to the arm so that the payload support may rotate about a second horizontal axis,
drive means coupled between the payload support, the interconnecting means and the pivotal mounting of the arm on the base for maintaining an attitude of the payload support with respect to the horizontal constant as the arm is rotated about the first axis,
means to apply a counter-balancing load to the arm at a second radius from said axis, wherein the second axis varies upon extension and retraction of the arm in a ratio fixed with respect to the first radius whereby the arm with a payload on the support is counter-balanced throughout its range of extension/retraction.

22. A load carrier as claimed in claim 21, wherein power operated means are provided for extending/retracting the arm and tilting the and about said first horizontal axis and a remote control unit is provided for controlling the power means.

23. A load carrier as claimed in claim 22, wherein the power means comprise a first power unit acting between adjacent stages of the arm for extending/retracting the arm and a second power unit acting on the arm to rotate the arm about said horizontal axis.

24. A load carrier as claimed in claim 23, wherein the arm has a control point at a radius from the horizontal axis of the arm in a fixed ratio with the radius of the payload support whatever the extension/retraction of arm whereby movement of the control point is reproduced by the payload in said fixed ratio and said power means act on the arm at said control point for causing the arm to extend/retract and tilt.

25. A load carrier as claimed in claim 24, wherein the power means acting on the control point of the arm comprises two power units for moving the control point in orthogonal directions to effect extension/retraction and tilting of the arm.

26. A load carrier as claimed in claim 25, wherein one of the power units acts in a vertical direction on the control point and the other power unit acts in a horizontal direction of the control point.

27. A load carrier as claimed in claim 21, wherein a pulley system interlinks the stages to cause each of the stages to move by equal amounts as the arm is extending/retracting.

28. A load carrier as claimed in claim 27, wherein one pulley system is provided for causing the stages to move by the same amounts as the arm is extended and another pulley system is provided for causing the stages to move by the same amounts as the arm is contracted.

29. A load carrier as claimed in claim 22, wherein a further power unit is provided for rotating the arm about a vertical axis extending through the horizontal axis about which the arm tilts, the further power unit also being under the control of said control units.

30. A load carrier as claimed in claim 21, wherein hydraulically operated means are provided between the respective stages for controlling extension/retraction of the arm.

* * * * *

UNITED STATES PATENT AND TRADEMARK OFFICE
CERTIFICATE OF CORRECTION

PATENT NO. : 5,697,757

DATED : December 16, 1997

INVENTOR(S) : Richard Arthur LINDSAY

It is certified that error appears in the above-identified patent and that said Letters Patent is hereby corrected as shown below:

In Column 9, line 39, change "the and" to --the arm--.

Signed and Sealed this

Ninth Day of June, 1998

Attest:

BRUCE LEHMAN

Attesting Officer

Commissioner of Patents and Trademarks